Jan. 27, 1942.   F. R. BALCAR   2,271,056
OXIDATION OF HYDROGEN CHLORIDE
Filed July 27, 1939
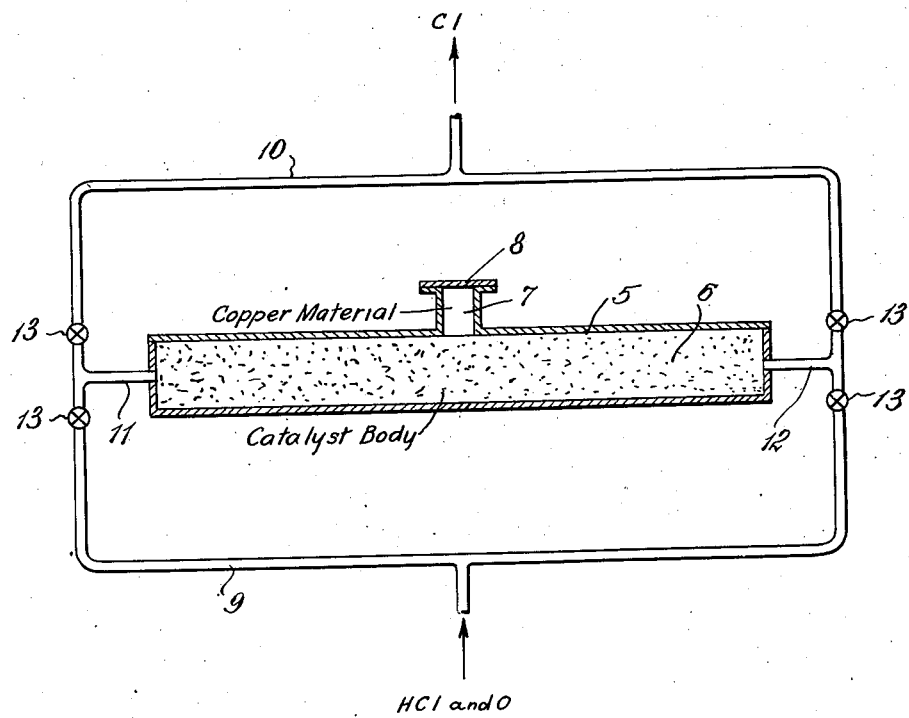
INVENTOR
Frederick R. Balcar
BY
ATTORNEYS Patented Jan. 27, 1942

2,271,056

UNITED STATES PATENT OFFICE 2,271,056

OXIDATION OF HYDROGEN CHLORIDE

Frederick R. Balcar, Stamford, Conn., assignor to Air Reduction Company, Incorporated, New York, N. Y., a corporation of New York Application July 27, 1939, Serial No. 286,853

4 Claims. (Cl. 23—219)

This invention relates to the production of chlorine and particularly to improvements in the method of producing free chlorine by oxidation of hydrogen chloride with air or oxygen.

Commercial chlorine has been produced for many years chiefly by the electrolysis of salt solutions such as aqueous solutions of sodium or potassium chloride. Electrolysis produces in addition to the chlorine, caustic soda or potash. The method is economical wherever a use may be found for the caustic soda or potash, but where such uses for the byproduct are absent, the method cannot be operated advantageously.

The Deacon process was devised many years ago to avoid the disadvantage of producing the byproducts of the electrolytic method. It depends upon the oxidation of hydrogen chloride with air in the presence of a catalyst at elevated temperature. The catalyst used originally in the Deacon process was copper sulphate on a suitable supporting material. Copper chloride was used later with some better results. Other proposed catalysts have been chlorides of magnesium, chromium, nickel, cobalt and iron on various types of carriers. All of the catalysts used or proposed in the Deacon process have been subject to the disadvantage that large quantities of the catalyst must be used to give commercial yields of chlorine, and furthermore that the catalyst loses its activity so rapidly as to make the operation of the process economically unsuccessful.

In the patent of Hoke S. Miller, No. 2,204,733, an improved method of producing chlorine by oxidation of hydrogen chloride has been described. It depends upon the use of a catalyst consisting of rare earth compounds in combination with copper. The method as described has resulted in a very marked improvement in the application of the oxidation reaction to produce chlorine, the results obtainable being such that the method may be applied economically in the commercial production of chlorine by oxidation of hydrogen chloride.

It is the object of the present invention to afford a further improvement in the method of producing chlorine by oxidation of hydrogen chloride.

Another object of the invention is the provision of a method wherein the initial catalyst mixture including rare earth compounds and copper can be prepared in situ, and the copper component can be added as necessary to make up any losses, so that the efficiency of the catalyst is maintained.

A further object of the invention is the provision of a method in which the composition of the catalyst can be adjusted during operation to secure the maximum yield of chlorine and to maintain that yield during extensive periods of operation.

Other objects and advantages of the invention will be apparent as it is better understood by reference to the following specification and the accompanying drawing, in which the figure represents diagrammatically a catalyst chamber and means permitting the addition of catalyst material thereto so that the reaction can be conducted and controlled in the manner described.

In carrying out the invention, I utilize catalytic material in which copper or a compound of copper is added to a compound of one or more of the group of metals commonly known as the rare earth group or a compound of uranium, the latter metal having the same characteristics as the metals of the rare earth group in the catalyst. By the "rare earth group," I mean to include those groups of metals of which the following are examples: scandium, cerium, lanthanium, praseodymium, neodymium, illinium, samarium, thorium, europium, gadolinium, terbium, yttrium, dysprosium, holmium, erbium, thulium, ytterbium, lutecium and zirconium.

The possible combinations of such materials are practically limitless, and it is unnecessary, for the purpose of explaining the invention, to expressly define every one of such possible combinations. In the commercial operation of the invention, the materials which can be obtained and utilized most economically will be employed. I prefer to use the mixture of rare earth compounds and associated materials ordinarily obtained from monazite sand, samarskite and other minerals, or the mixture of these materials remaining after the extraction of one or more of the individuals such as thorium or cerium from the minerals.

As is evident, the composition of the catalytic material may be varied within wide limits. Good results have been obtained when the amount of copper compound present is such that the catalyst contains a fraction of one per cent by weight of copper, or the copper content of the catalyst may be increased to 25% by weight or even more. At the same time, the amount of rare earth material added may be varied from a fraction of one per cent by weight to 90% by weight or more, if desired. The preferred composition includes 1–5% by weight of copper and 10–60% by weight of one or more of the rare earth materials previously described.

The present invention depends upon the addition of the copper or copper compound after the rare earth material on a suitable carrier has been disposed in the catalyst chamber, heated to the desired temperature and subjected to the gaseous mixture of hydrogen chloride and air or oxygen at substantially the temperature of the reaction. The copper or copper compound is added at this point and permitted to disseminate through the catalyst, whereupon the percentage of conversion of the yield of chlorine from the reaction immediately increases at a rapid rate to the maximum obtainable. The amount of copper or copper compound which is added may be adjusted readily to attain the maximum conversion and yield. Moreover, as copper is lost from the catalyst as the result of vaporization, additional quantities of copper or a copper compound may be introduced to maintain the catalyst at its optimum activity.

In preparing the catalyst material containing rare earth compounds, I select a suitable carrier such as pumice, silica gel, diatomaceous earth or other porous material that will withstand the effect of elevated temperatures and exposure to chlorine, hydrogen chloride, oxygen and steam. I may precipitate the metals of the rare earth group or uranium as hydroxides on the support, it being understood that as hereinbefore indicated various mixtures of the rare earth metals may be utilized. Alternatively, the supporting material may be soaked in a solution of the salts of the appropriate metals of the rare earth group or uranium, for example the chlorides or nitrates, and the supporting material may then be dried before use. Also, the supporting material may be impregnated with the mixed salts or oxides of the rare earth metals or uranium with the subsequent addition with stirring of water or a solution of ammonia or sodium or potassium hydroxides or other alkaline solution, after which the resulting mixture may be dried and heated to the reaction temperature. If desired, the catalyst may be prepared by precipitating the metals as hydroxides with sodium or potassium hydroxide as the precipitating agent, or the oxides or other materials may be thoroughly mixed and pressed into pellets for use. After the catalyst material has been prepared as described or in any other suitable manner, it is charged into a reaction chamber and is heated to the desired temperature by any suitable heating means provided for that purpose. A flow of the gaseous mixture of hydrogen chloride and air or oxygen is then established through the reaction chamber and the catalyst material. Preferably the apparatus employed is designed to permit periodic reversal of the direction of flow of the gaseous mixture in order to prevent, so far as possible, escape of the volatile portion of the catalyst which is supplied by introducing at an intermediate point in the catalyst chamber, copper or a compound of copper, which is volatilized and thus distributed throughout the bed of the catalyst. In this manner, the volatile portion of the catalyst may be supplied in the exact amount and in the proper location for optimum performance of the catalyst. Furthermore, the volatile portion of the catalyst being deposited from the vapor state on the surface of the non-volatile portion in the reaction zone, is immediately available for catalyzing the reaction, and full production may be established in a relatively short period of operation.

The form in which the volatile portion of the catalyst is added is not important, provided that it may be volatilized readily and thus distributed. It may be added, for example, in the form of metallic copper or in the form of copper oxide or chloride, or as a metallo-organic compound, or in fact in any form in which the purpose of the invention will be accomplished.

The apparatus employed forms no part of the present invention, and any suitable apparatus may be utilized. Consequently the accompanying drawing illustrates merely a catalyst chamber 5 carrying the catalyst 6. At an intermediate portion of the catalyst chamber an inlet 7, having a closure 8, is provided to permit the introduction of the volatile portion of the catalyst as may be required. To facilitate the introduction of the gaseous mixture of hydrogen chloride and air or oxygen, the removal of the gaseous products and particularly the reversal of flow of the gaseous mixture through the catalyst, the ends of the catalyst chamber are connected to pipes 9 and 10 with connections 11 and 12 and valves 13. By manipulating the valves, the entering gaseous mixture can be directed through the catalyst chamber as desired, and the gaseous products can be withdrawn. As the reaction proceeds, the volatile copper material is introduced from time to time to maintain the catalyst at its optimum activity.

As an example of the operation as described, about 900 c. c. of pumice, carrying 20–30% of its own weight of difficultly volatile rare earth chlorides, was charged into a suitable reaction chamber. The pumice and rare earth chlorides were then heated to a temperature between 425° and 600° C., and a flow of 25 cubic feet per hour of hydrogen chloride and about 2.5 cubic feet per hour of oxygen was passed over the catalyst, the direction of flow being reversed periodically. About 0.07 pound per hour of chlorine were produced under these conditions. Thereafter about 0.5 gram of copper in the form of copper shot were introduced into the intermediate portion of the catalyst. A volatile copper compound was formed and deposited in the reaction zone, so that in less than one hour a production of 0.56 pound of chlorine per hour was established. The foregoing is merely illustrative of the results obtainable by the practice of the method as here described.

While I prefer to operate with a reaction temperature in the vicinity of 425–600° C., I have obtained good results at temperatures as low as 300–350° C. and with temperatures as high as 650–800° C., and higher.

The practice of the method as described herein avoids the necessity for an extended period of "conditioning" of the catalyst, and as indicated it facilitates the determination of the proper proportion of copper in the catalyst, since it may be added in successive portions until the maximum catalyst activity has been established.

The term "oxygen" in the accompanying claims is used to include oxygen and oxygen-containing gases. The term "rare earth group" includes the metals defined as included in the group in the specification.

Various changes may be made in the form and arrangement of the apparatus, the details of procedure and particularly in the composition of the catalyst within the limits hereinbefore prescribed, without departing from the invention or sacrificing any of the advantages thereof.

I claim:

1. The method of producing chlorine by oxidation of hydrogen chloride which comprises disposing in a catalyst chamber an extended catalyst body comprising a support and at least one compound of a metal of the group consisting of uranium and the metals of the rare earth group, which compound is not vaporizable during the oxidation reaction, heating the catalyst body to an elevated temperature, establishing a flow of a mixture of hydrogen chloride and oxygen lengthwise through the extended catalyst body, introducing, independently of the mixture of hydrogen chloride and oxygen, a vaporizable copper material from a source external of the reaction zone into the extended catalyst body at a central portion thereof and intermediate the point of introduction of the mixture of hydrogen chloride and oxygen and the point of exit of the reaction product, permitting the copper material to disseminate through the catalyst body, and thereafter causing the flow of hydrogen chloride and oxygen to pass alternately in opposite directions through said catalyst body.

2. The method of producing chlorine by oxidation of hydrogen chloride which comprises disposing in a catalyst chamber an extended catalyst body comprising a support and at least one compound of a metal of the group consisting of uranium and the metals of the rare earth group, which compound is not vaporizable during the oxidation reaction, heating the catalyst body to an elevated temperature, establishing a flow of a mixture of hydrogen chloride and oxygen lengthwise through the extended catalyst body, introducing, independently of the mixture of hydrogen chloride and oxygen, a vaporizable copper material from a source external of the reaction zone into the extended catalyst body at a central portion thereof and intermediate the point of introduction of the mixture of hydrogen chloride and oxygen and the point of exit of the reaction product, permitting the copper material to disseminate through the catalyst body, thereafter causing the flow of hydrogen chloride and oxygen to pass alternately in opposite directions through said catalyst body, and introducing additional amounts of the vaporizable copper material into the catalyst body at said central portion thereof to compensate for losses of vaporizable copper material from the catalyst body.

3. The method of producing chlorine by oxidation of hydrogen chloride which comprises disposing in a catalyst chamber an extended catalyst body comprising a support and at least one compound of a metal of the group consisting of uranium and the metals of the rare earth group, which compound is not vaporizable during the oxidation reaction, heating the catalyst body to a temperature between 400° C. and 600° C., establishing a flow of a mixture of hydrogen chloride and oxygen lengthwise through the extended catalyst body, introducing, independently of the mixture of hydrogen chloride and oxygen, a vaporizable copper material from a source external of the reaction zone into the extended catalyst body at a central portion thereof and intermediate the point of introduction of the mixture of hydrogen chloride and oxygen and the point of exit of the reaction product, permitting the copper material to disseminate through the catalyst body, and thereafter causing the flow of hydrogen chloride and oxygen to pass alternately in opposite directions through said catalyst body.

4. The method of producing chlorine by oxidation of hydrogen chloride which comprises disposing in a catalyst chamber an extended catalyst body comprising a support and at least one compound of a metal of the group consisting of uranium and the metals of the rare earth group, which compound is not vaporizable during the oxidation reaction, heating the catalyst body to a temperature between 400° C. and 600° C., establishing a flow of a mixture of hydrogen chloride and oxygen lengthwise through the extended catalyst body, introducing, independently of the mixture of hydrogen chloride and oxygen, a vaporizable copper material from a source external of the reaction zone into the extended catalyst body at a central portion thereof and intermediate the point of introduction of the mixture of hydrogen chloride and oxygen and the point of exit of the reaction product, permitting the copper material to disseminate through the catalyst body, thereafter causing the flow of hydrogen chloride and oxygen to pass alternately in opposite directions through said catalyst body, and introducing additional amounts of the vaporizable copper material into the catalyst body at said central portion thereof to compensate for losses of the vaporizable copper material from the catalyst body.

FREDERICK R. BALCAR.